May 6, 1952     W. M. HARCUM     2,595,250
AUTOMATIC RECOVERY PILOT FOR AIRCRAFT
Filed May 15, 1945     4 Sheets-Sheet 1

INVENTOR
WILLIAM M. HARCUM
BY
Herbert H. Thompson
his ATTORNEY.

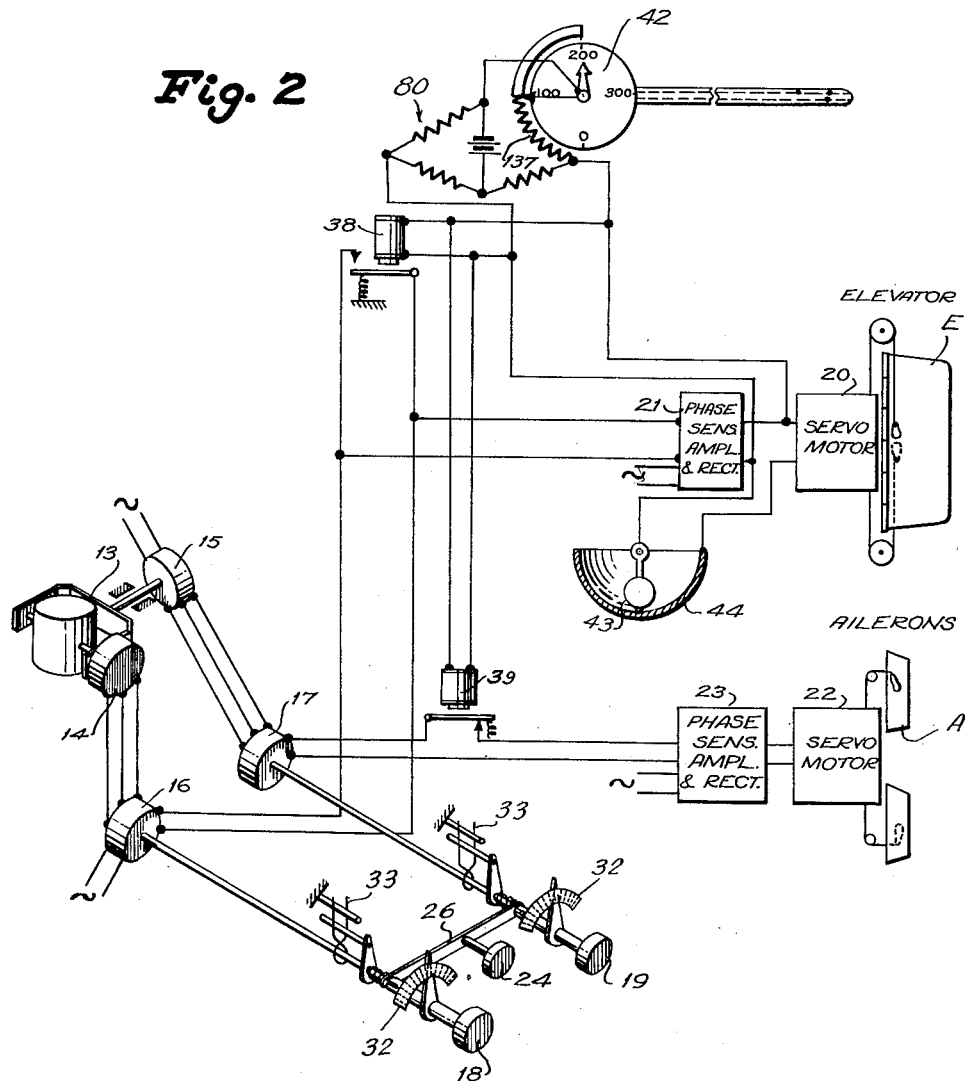

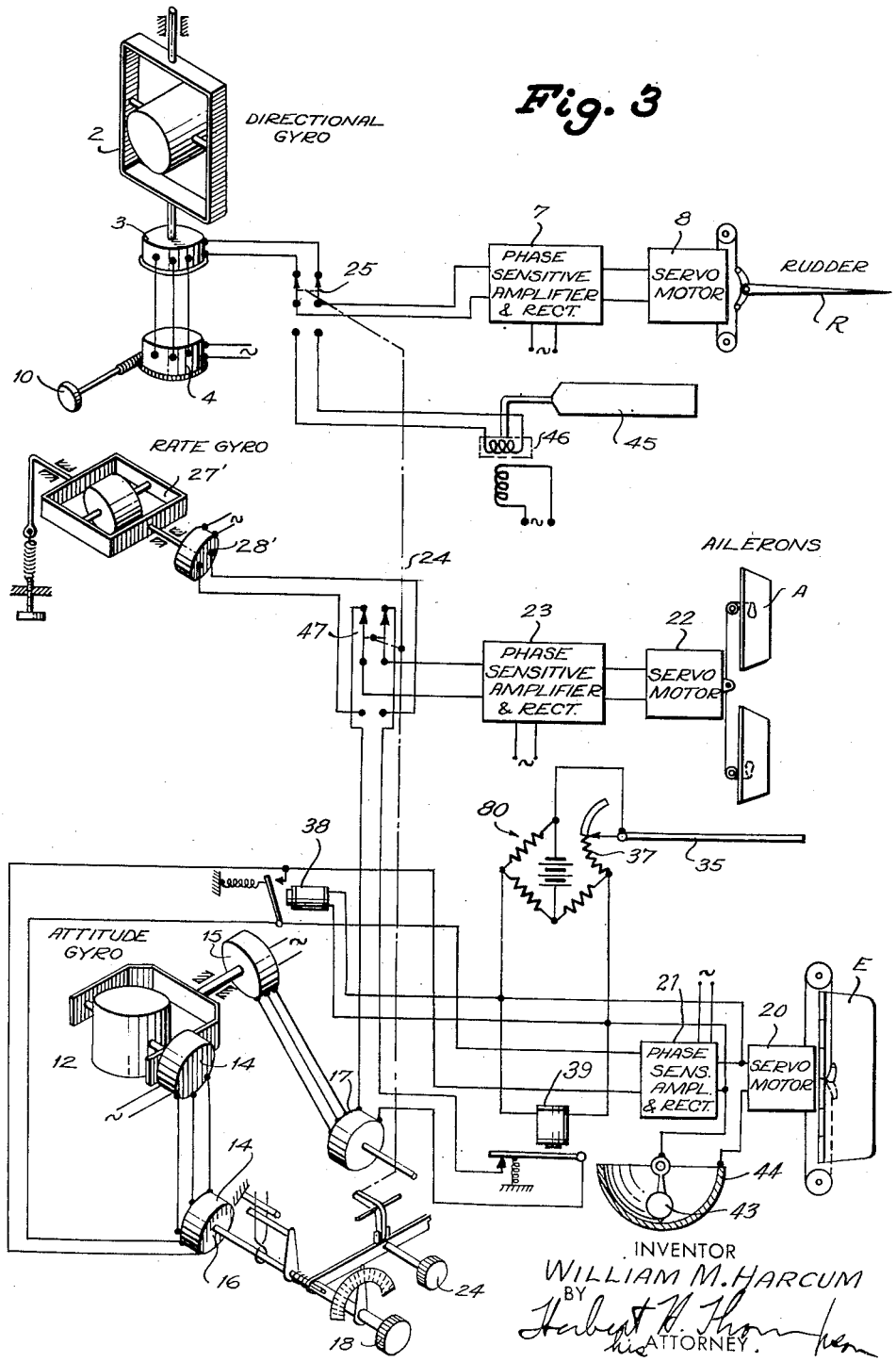

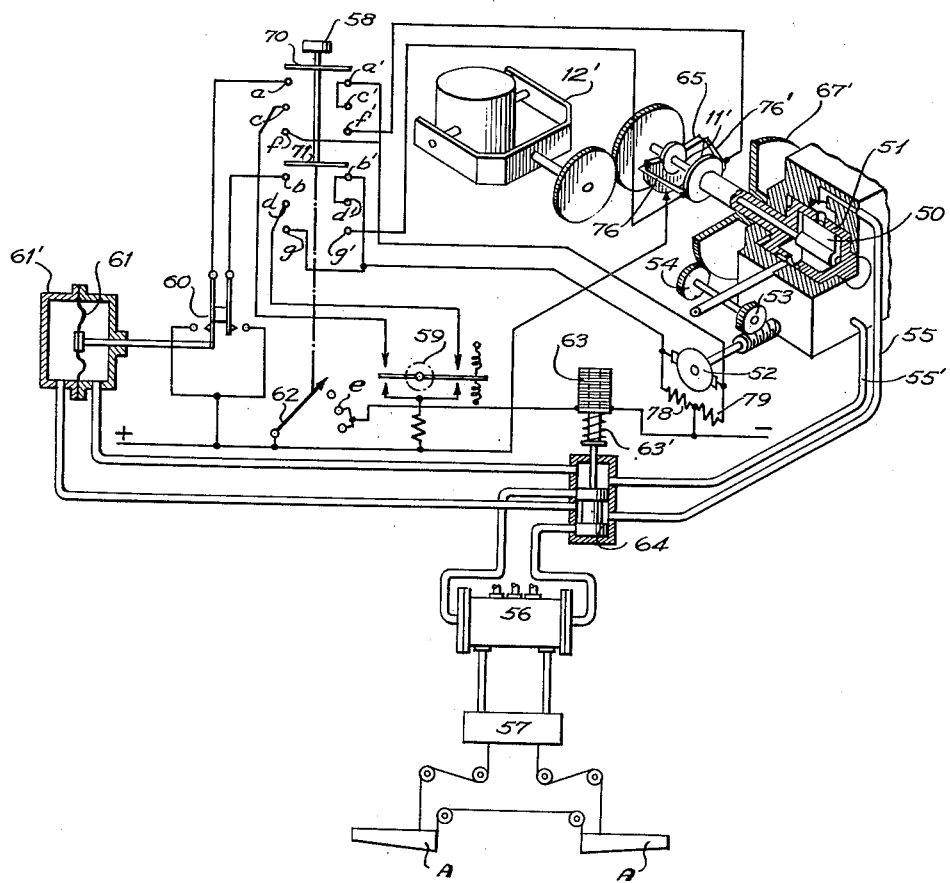

Patented May 6, 1952

2,595,250

UNITED STATES PATENT OFFICE 2,595,250

AUTOMATIC RECOVERY PILOT FOR AIRCRAFT

William M. Harcum, Garden City, N. Y., assignor to The Sperry Corporation, a corporation of Delaware Application May 15, 1945, Serial No. 593,785

9 Claims. (Cl. 244—77)

1

This invention relates to automatic pilots for aircraft and, more particularly, to an improvement in the same whereby the automatic pilot may be relied upon to bring the airplane back to a definite flight condition, such as straight level flight, regardless of what condition the craft may be in at the time the automatic pilot is thrown in, if such can be accomplished through the ordinary control surfaces of the craft. While the ordinary automatic pilot may be made to perform this function when the aircraft is not in an unconventional attitude or flying condition, and if the aviator remembers to first bring all setting knobs to zero, the aviator cannot rely on the present automatic pilots to invariably perform this highly desirable function in an emergency because present-day automatic pilots do not operate properly under abnormal conditions such as upside down flight, or flight at very steep bank angles, on the order of 90°, nor when the airplane has lost its proper sustaining air speed.

According to my invention, I propose to provide an improved automatic pilot which may assume or be caused to assume control at any time, even if the aviator is disabled, and which may be relied upon to bring the airplane into straight, level flight under those unusual flight conditions which can be recovered from through proper operation of the usual control surfaces of the craft.

Referring to the drawings, illustrating several forms my invention may assume,

Fig. 2 is a similar diagram of a modification showing the elevator and aileron control only.

Fig. 3 is a third modified form my automatic pilot may assume, which has adaptation to aircraft of the flying wing or two-axis control type, as well as to the three-axis control airplane.

Fig. 4 is a diagrammatic showing of my invention as applied to a different type of automatic pilot.

Figure 1:
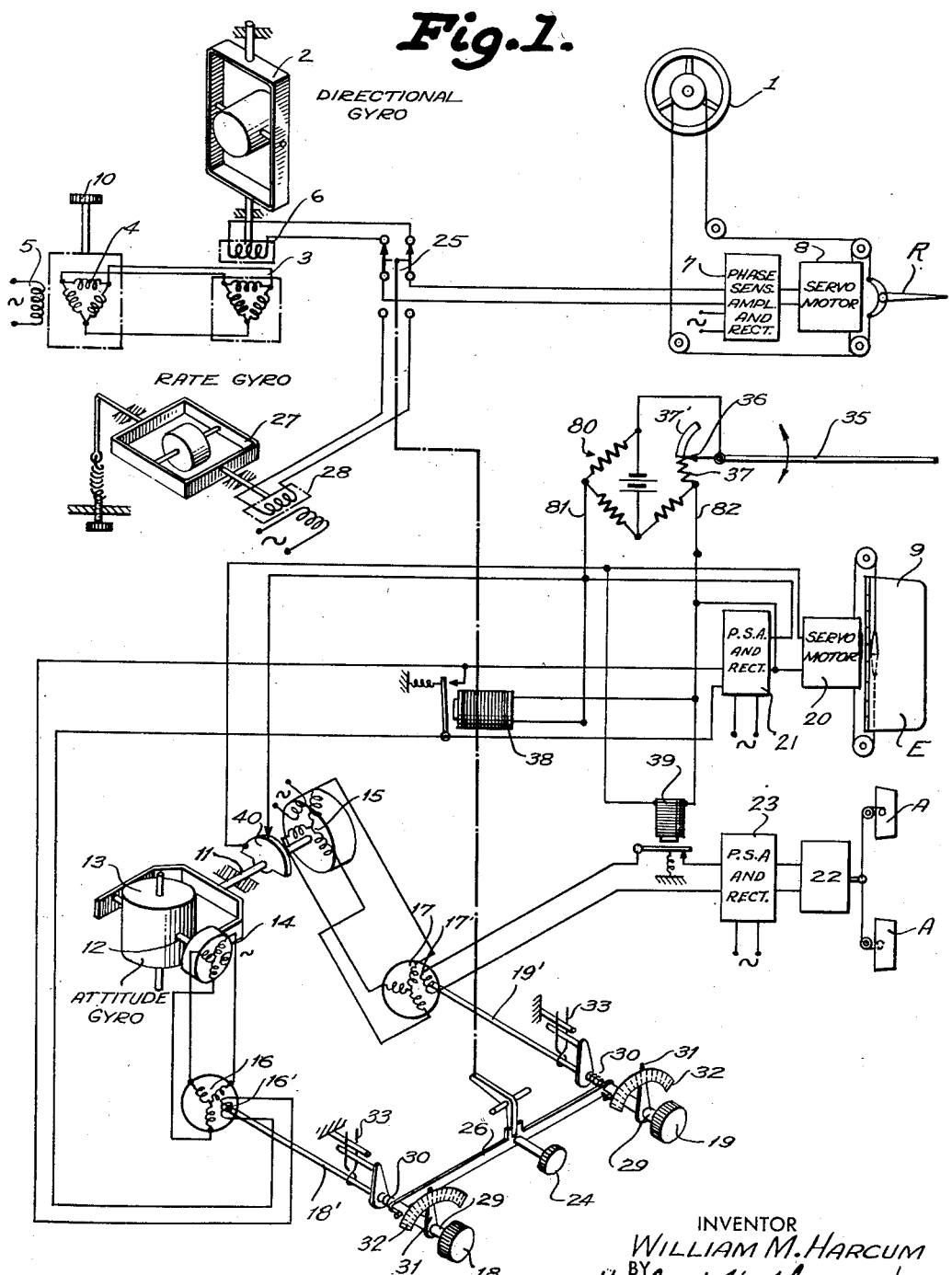
Fig. 1 is a diagram illustrating my invention as applied to an ordinary airplane automatic pilot normally having the characteristic controls about all three axes.

Since automatic pilots for aircraft are now well known, I have illustrated the same diagrammatically in the present application.

In Fig. 1, the airplane is shown as controlled by means of the usual rudder R, elevator E and ailerons A, each of which may be controlled directly by hand as well as automatically through servomotors. For the sake of simplicity, only the hand control 1 for the rudder is shown. For automatically controlling the rudder, there is

2 shown a course maintaining device such as a directional gyroscope 2 of conventional type, from which a signal is generated as by a selsyn signal generator 3 for operating the rudder servomotor 8 to maintain the course. A change of course may be readily effected by a second selsyn generator 4, the polyphase windings of which are cross-connected to the polyphase windings of generator 3. The single-phase winding of one of these generators, shown as winding 5 of generator 4, is connected to a single-phase source. Any relative displacement of the single-phase winding 6 of the generator 3, which winding is mounted to turn with the gyroscope, supplies an alternating signal voltage to the phase-sensitive rectifier 7 having a reversible direct current output controlling the servomotor 8 which turns the rudder R. Motor 8 may be a conventional direct current motor, a relay-controlled hydraulic motor or other convenient source of power. Change of course is effected by turning a knob 10 to displace one of the windings 4 or 5 with respect to the other.

Similar selsyn signal generators 14 and 15 are shown about the major and minor axes 11 and 12 of the stabilizing or attitude gyro 13. In this case, the single-phase windings of the generators 14 and 15 are connected to an alternating current source and the signals are supplied from the single-phase windings of the settable generators 16 and 17. The latter are positioned from pitch controlling knob 18 and roll controlling knob 19, respectively, so that any desired pitch or roll may be set in without disturbing the gyroscope. The pitch signal is shown as controlling the servomotor 20 operating the elevator E through the phase-sensitive rectifier 21, and the roll signal is shown as operating the ailerons A through servomotor 22 and phase-sensitive rectifier 23.

The parts so far described are intended to represent any conventional automatic pilot to which my improvements may be applied with appropriate modifications.

With master control knob 24 in the position shown, the throw-over switch 25 and the automatic zeroing member 26 are in the position shown, so that the automatic pilot is under normal operating conditions and may be either controlling the craft or not, as desired, under the control of a master power supply switch (not shown). Button 24 is connected both with control switch 25 and zeroing member 26, so that when it is pushed inwardly, it disconnects the control of the rudder from the directional gyroscope and places the rudder under the control of some means to stop turning, in this instance, a rate-of-turn gyroscope 27, which is shown as having a suitable inductive pick-off 28. Therefore, when the knob is in, the rate gyro assumes control to eliminate turning of the craft due to any cause, whether due to turn setting 10, a tail spin or otherwise. At the same time bar 26 is pushed rearwardly, pushing the splined sleeves 29, on which knobs 18 and 19 are mounted, rearwardly against the action of coil springs 30 and thus releasing the spring detents 31 from engagement with serrations on the back side of the fixed sectors 32. Centralizing springs 33 are shown secured to the shafts 18' and 19' carrying signal windings 16' and 17', respectively. Upon release of the detents, springs 33 return the signal generators to their normal positions with respect to the polyphase windings, so as to eliminate any turn or dive signals that might have been set in by the knobs 18 and 19 and bring the craft to level flight.

If it should happen, however, that at the time the automatic pilot is thrown in, the airplane has insufficient air speed so that it has or is likely to stall, I prefer to prevent the gyroscope 13 from assuming control of the elevator for the time being and to cause the airplane temporarily to dive until its air speed is regained. For this purpose I employ some form of stall or near-stall detector such as an angle-of-attack vane 35 which normally provides no signal in the system, but which, if the angle of attack is too great, applies a down signal to the elevator and throws out the gyroscopic control about both the pitch and preferably also the roll axis. For this purpose, the angle-of-attack vane is shown as having a contact 36 riding over a conducting sector 37' and a resistance 37 forming a part of a Wheatstone bridge 80. As long as the vane is in the position shown, or engages the segment 37', it has no effect in the system. If, however, the rear of the vane should be tilted upwardly, caused by the loss of angle of attack, balancing resistance 37 is reduced and current is caused to flow between the opposite corners of the bridge to supply an E. M. F. to wires 81 and 82. This performs the following operations in the system: it severs or neutralizes the normal pitch signal from the stabilizer gyroscope 13; it likewise preferably severs or neutralizes the normal roll signal from the stabilizer and it causes the aircraft to dive. To accomplish these results, (1) The vane 35 excites a magnet 38 to short-circuit the signal from winding 16' and thereby render ineffective the pitch signal from the gyroscope.

(2) It excites a magnet 39 and thereby opens the circuit of the roll signal from winding 17' and thereby temporarily severs the control of the gyroscope to the ailerons. This is considered desirable although it may not be necessary, since recovery of flying speed is of paramount importance.

(3) The signal across the potentiometer is applied directly (or through an amplifying relay) to the direct current servomotor 20 of the elevator to cause diving at an angle proportional to the departure of the vane 35 from the normal position.

As soon as the correct angle of attack is restored, the controls are returned to the gyro vertical by the disappearance of an E. M. F. across wires 81 and 82.

In case, however, the airplane is upside down or in a bank angle of more than 90°, I prefer to first roll the airplane over to not greater than a 90° bank, at least, before the gyro stabilizer is thrown in, and even before the air speed recovery mechanism becomes operative. This is to prevent reverse operation of the elevator in case the aircraft is upside down or approaching such condition, under which conditions the ordinary elevator control from the gyro-vertical of the automatic pilot would be in the wrong direction to right the craft. In other words, the elevator signals from the gyro-vertical are reversed and hence worse than useless when the craft is upside down. For this purpose I have shown on the major axis 11 of the gyroscope a semicircular contactor 40 which is placed in series with at least one of the main leads to the servomotor 20. If the airplane were rolled over more than 90° in either direction, this contact would be broken and therefore the elevator control severed until the ailerons have put the plane back to somewhere near normal position. After this occurs, the normal control would be assumed by the gyroscopes unless flying speed had been lost, in which case the angle-of-attack vane 35 would assume control, as explained above.

It is obvious that other means of detecting lose of flying speed or a stall condition may be employed instead of an angle-of-attack vane, and in Fig. 2 I have shown instead an air-speed meter 42 which may be connected in a fashion similar to the vane in Fig. 1, to vary a resistance 137 in a Wheatstone bridge 80 when the air speed falls to near the critical value. Also, instead of employing a semicircular segment on the gyro for detecting inverted flight conditions, I may employ an independent pendulum 43 for this purpose, operating in a hemispherical conducting bowl 44, so that in case the pendulum leaves the bowl, the contact is broken and the elevator control severed.

In Fig. 3 a somewhat different solution of the problem is shown, the parts being numbered to correspond to Fig. 1. In this case, instead of transferring the control from the directional gyro or other course maintaining device, to a rate-of-turn gyroscope for automatic recovery, I have shown the azimuth control transferred from the directional gyroscope to a side-slip detector which is shown in the form of a vane 45 pivoted about a normally vertical axis. When there is no side slip present, no signal is given by the pick-off 46. In the presence of side slip in one direction or the other, a signal of one phase or the other is transmitted to the phase-sensitive rectifier 7 to control the rudder, as before.

The aileron control in this instance is also somewhat different from that in Fig. 1. In this case, a rate-of-turn gyroscope 27' is employed, not to control the rudder as in Fig. 1, but to eliminate turns by controlling the ailerons. There is shown connected to the rod 24', controlled by knob 24, an extra switch 47 which, when the rod is pushed down, transfers the control of the ailerons from the roll pick-offs 15 and 17 at the attitude gyro to the pick-off 28' on the rate gyro 27'. The rate gyroscope will, therefore, not only eliminate turn but eliminate bank of the craft, since the two are tied closely together and bank cannot occur without causing turning, unless side slip is present, and side slip is prevented by the detector 45 operating through the rudder.

If the proper angle of attack or air speed is not being maintained, I employ an angle-of-attack meter 35, as in Fig. 1, and an auxiliary pendulum 43 and bowl 44 are shown for detecting upside down conditions, as in Fig. 2.

The auto-recovery pilot shown in this figure is especially adapted for rudderless aircraft, such as the flying wing type, simply by omitting the rudder and the control thereof from this figure. Or, as explained in my copending application, joint with Percy Halpert, Serial No. 484,656, for Automatic Pilot for Dirigible Craft, filed April 26, 1943, now Patent No. 2,417,821 issued March 25, 1947, the directional gyro control could be connected into the aileron control in normal flight, but would be thrown over to a side-slip vane 45 or the rate gyro when the button 24 is pushed in.

Also, in the form shown in Fig. 3 the use of the rate gyro as an alternative aileron control may be omitted, if desired, since a roll signal from the attitude gyro will always unbank the plane until the signal becomes zero, and since the rudder is controlled in a manner to prevent side slip, the result is zero bank and zero rate of turn.

Fig. 4 shows my invention as applied to a gyro pilot of the pneumatic-hydraulic type of the general character shown in my prior application, joint with Gifford Bull, Serial No. 543,992, filed July 8, 1944, for Automatic Pilots for Aircraft. Only the aileron control is shown for simplicity. In this figure I have also shown that the pick-off indices at the gyro may be either automatically zeroed for automatic recovery, or automatically aligned at will for smooth operation when frequently throwing in and out the gyro pilot. In this case, the roll pick-off is shown as of the pneumatic type comprising the usual differential vane or valve 50 on a shaft 11' turned from the gimbal ring of the gyro vertical 12'. The vane is enclosed in the usual ported sleeve 51 journaled concentrically with the vane 50 and positioned from the power motor 52 through suitable reduction gearing 53, 54 and 67'. The differential pressure from the pick-off valve is transmitted through pipes 55, 55' normally to the relay valve 56, by which the pneumatic pressure is multiplied and transmitted to the hydraulic servomotor 57 controlling the ailerons A.

A plurality of alternative controls, are provided for the motor 52, whereby it may perform one of several functions under different positions of the control button or knob 58, connected to a pair of bridging contacts 70 and 71 which cooperate with two three-contact groups. Also connected to said knob is a switch arm 62.

In the first position, contacts $a$ and $a'$ and $b$ and $b'$ are bridged. This places motor 52 under the control of switch 60, which in turn is controlled by diaphragm or piston 61 within a pressure chamber 61'. As switch 62 is at this time open, solenoid 63 remains unexcited and the piston valve 64 connected thereto is held in its downward position by a spring 63'. Therefore, under these conditions the air signal from the pick-off 50 is transferred to the chamber 61' so that the motor 52 will be run to turn the sleeve valve 67 to align it with the valve 50. This operation is referred to as automatic alignment, and when the knob is pushed to position 2 and the automatic pilot is thrown in, the airplane will continue to fly in the attitude in which it was at the time the pilot was thrown in. Since the switch must pass through position 1 to reach position 2, automatic alignment is assured.

In position 2 of knob 58 contacts $c$ and $c'$ and $d$ and $d'$ are bridged and arm 62 makes contact with $e$. In this position the pilot is in operation and attitude changes may be effected by turning the course or attitude change knob 59 to cause motor 52 to run in one direction or the other, as desired. At the same time the solenoid 63 is excited from the closure of contacts 62–$e$, so that the valve 54 is in the uppermost position and the air signals are transferred to the transfer valve 56 controlling servo 57.

In case the aviator desires to resume straight level flight at any time or to automatically recover from an undesirable attitude, he pushes knob 58 to the third position, bridging contacts $f$, $f'$ and $g$, $g'$, but keeping the circuit through solenoid 63 closed. In this position the motor 52 is directly controlled from an arcuate contact segment 65 on the shaft 11' of the pick-off valve 50 with which contacts 76 and 76' connected to sleeve valve 57 cooperate. In the position shown in the drawings, the motor will stand still because equal current is sent from both contacts 76 and 76' through opposed field windings 78 and 79, but in case the follow up sleeve 57 is tilted with respect to the gyro, one of said contacts 76 or 77 will be broken and the motor will run in the proper direction to align the ports on the sleeve 57 with the valve 50 in whatever position it may be. The operation is referred to as automatic zeroing.

If the aviator desires automatic recovery at a time when the automatic pilot is out of operation, he quickly pushes the button down to its lowermost position.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pilot for aircraft having the normal bank and pitch stabilizer and rudder controls for maintaining level straight flight, manual means for altering the output of said controls for causing bank, pitch and turn of the craft, auxiliary means for causing said pilot, when thrown in, to recover level straight flight for unusual flight conditions, including a rate of turn responsive device, means for transferring the rudder control from the normal rudder control to said device for stopping turning regardless of heading, and means for simultaneously zeroing said manually altering means to restore the control of said stabilizer controls solely to the normal bank and pitch stabilizer, whereby level straight flight is reestablished through the automatic pilot.

2. An automatic recovery pilot as claimed in claim 1, having means responsive to stall conditions for causing diving of the craft independently of the normal pitch control of the automatic pilot until the proper flying speed is restored, and means for thereafter retransferring the controls to the normal pitch stabilizing control of the automatic pilot.

3. An automatic recovery pilot as claimed in claim 1, having means independent of the normal bank and pitch controls of the automatic pilot and responsive to an upside down condition of the craft for rolling the craft over to right the same prior to leveling the craft about its pitch axis, and thereafter retransferring the controls to the normal bank and pitch controls of the automatic pilot.

4. An automatic recovery safety device for automatic pilots for aircraft, the combination with a direction maintaining instrument controlling the rudder servo, and an attitude instrument controlling the roll and pitch servos, an auxiliary turn responsive device for controlling the rudder, manual controllers for causing roll and pitch by altering the output from said attitude instrument, and throw-over means for both transferring the control of said rudder servo to said auxiliary device and for zeroing the manual controllers associated with said attitude instrument.

5. An automatic recovery safety device for conventional automatic pilots for aircraft, the combination with a direction maintaining instrument controlling the rudder servo, and an attitude instrument controlling the roll and pitch servos, an auxiliary turn responsive device for controlling the rudder, manual controllers for causing roll and pitch by altering the output from said attitude instrument, throw-over means for both transferring the control of said rudder servo to said auxiliary device and for zeroing the manual controllers associated with said attitude instrument, and means responsive to an upside down condition of the craft for severing the control of the pitch servo from said attitude instrument until the aircraft is righted.

6. An automatic recovery safety device for conventional automatic pilots for aircraft, the combination with an attitude instrument controlling the roll and pitch servos, an auxiliary turn responsive device for controlling the rudder, manual controllers for causing roll and pitch by altering the output from said instrument, throw-over means for both transferring the control of said rudder servo to said auxiliary device and for zeroing the manual controllers associated with said attitude instrument, and means responsive to a lack of sufficient flying speed for actuating the pitch servo to cause diving and severing the control from said attitude instrument.

7. An automatic recovery safety device for conventional automatic pilots for aircraft, the combination with an attitude instrument controlling the roll and pitch servos, manual controllers for causing roll and pitch by altering the output from said attitude instrument, throw-over means for zeroing the manual controllers associated with said attitude instrument, and means responsive to an upside down condition of the craft for severing the control of the pitch servo from said attitude instrument until the aircraft is righted.

8. An automatic recovery safety device for conventional automatic pilots for aircraft, the combination with an attitude instrument controlling the roll and pitch servos, manual controllers for causing roll and pitch by altering the output from said instruments, throw-over means for zeroing the manual controllers associated with said attitude instrument, and means responsive to a lack of sufficient flying speed for actuating the pitch servo to cause diving and severing the control from said attitude instrument.

9. An automatic recovery safety device for conventional automatic pilots for aircraft, the combination with a direction maintaining instrument controlling the rudder servo, and an attitude instrument controlling the roll and pitch servos, an auxiliary turn responsive device for alternatively controlling the rudder, manual controllers for causing turn, roll and pitch by altering the output from said instruments, throw-over means for both transferring the control of said rudder servo to said auxiliary device and for zeroing the manual controllers associated with said attitude instrument, and means responsive to a lack of sufficient flying speed for actuating the pitch servo to cause diving and severing the control from said attitude instrument.

WILLIAM M. HARCUM.

REFERENCES CITED

The following references are of record in the file of this patent:

UNITED STATES PATENTS

| Number | Name | Date |
|---|---|---|
| 2,095,251 | Hendrickson | Oct. 12, 1937 |
| 2,099,808 | Havill | Nov. 23, 1937 |
| 2,210,916 | Kenyon et al. | Aug. 13, 1940 |
| 2,283,754 | Mathews | May 19, 1942 |
| 2,297,412 | Hoppe | Sept. 29, 1942 |
| 2,307,941 | Meredith | Jan. 12, 1943 |
| 2,350,024 | Francis | May 30, 1944 |
| 2,439,750 | Nisbet et al. | Apr. 13, 1948 |
| 2,464,629 | Young | Mar. 15, 1949 |
| 2,516,796 | Noxon et al. | July 25, 1950 |